2,192,872

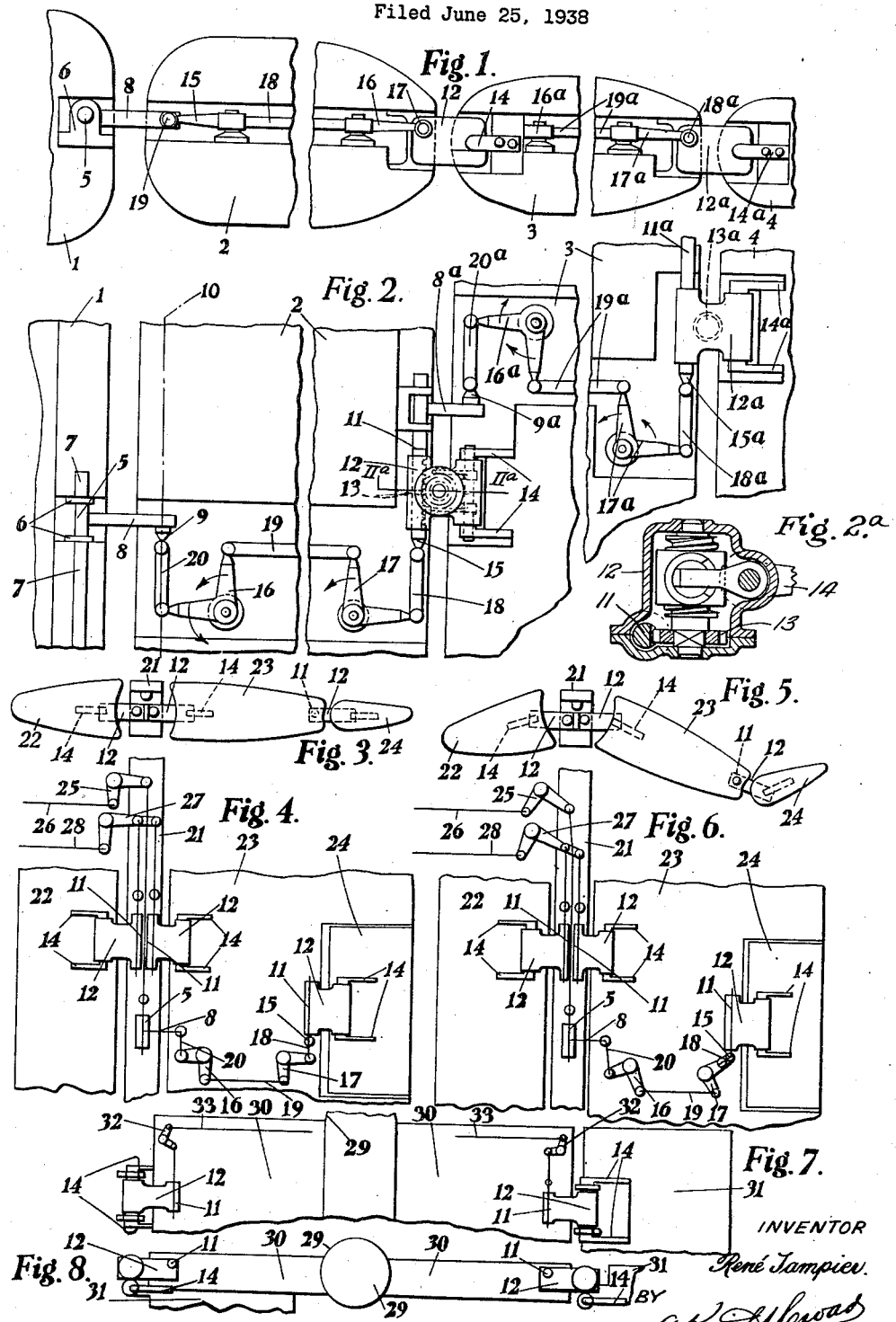
March 5, 1940. R. TAMPIER 2,192,872
MEANS FOR CONTROLLING THE MOVING SURFACES OF AIRCRAFT
Filed June 25, 1938
INVENTOR
René Tampier
BY
ATTORNEY Patented Mar. 5, 1940

UNITED STATES PATENT OFFICE 2,192,872

MEANS FOR CONTROLLING THE MOVING SURFACES OF AIRCRAFT

René Tampier, Boulogne-sur-Seine, France

Application June 25, 1938, Serial No. 215,939
In Great Britain July 29, 1937

3 Claims. (Cl. 244—44)

This invention relates to means for varying the contour of aerofoil and like bodies, control surfaces and the like made in three or more parts hingedly connected together in tandem, means being provided for commonly operating two or more of said hinge connections.

The object of the present invention is to provide an improved operating mechanism for such bodies and surfaces, According to the present invention the hinge mechanisms are operated by axially slidable members which move along the respective hinge axes, the mechanism being unaffected by the usual operation of control surfaces and the like.

Means according to the present invention for operably connecting together in tandem a plurality of parts of an aerofoil or like body, control surface and the like may comprise two or more hinge mechanisms disposed in tandem and operatively connected respectively to the parts, an axially slidable member moving along a hinge axis for operating one of said hinge mechanisms, and means for transmitting the operation to each succeeding hinge, whereby all said operatively associated tandem hinge mechanisms are operated in unison.

The said transmitting means may be disposed respectively within the respective interconnected parts of the said body or surface.

Each hinge mechanism may comprise a longitudinally displaceable member, said displaceable member being operatively connected to the transmission to the next hinge.

The longitudinally displaceable member may directly operate a slidable member moving along a hinge axis.

The foregoing, and other novel features of the present invention are illustrated in the various applications of the invention shown in the accompanying drawing wherein—

Figures 1 and 2 are respectively a side elevation and a plan showing the invention employed for controlling the independently movable trailing edge portions of an aileron;

Figure 2a is a section taken on line II—II, Fig. 2;

Figures 3 and 4 are views similar to Figures 1 and 2 showing the invention employed for controlling the movable elements of a wing and an auxiliary moving surface, these parts being shown in their neutral position;

Figures 5 and 6 are views similar to Figures 3 and 4 showing the parts in a deflected position, and, Figures 7 and 8 are respectively a plan and an end elevation showing the invention employed for controlling the folding wing portions of an aeroplane.

Referring to Figures 1 and 2, 1 is the rear portion of a fixed portion of the wing, 2 is the main portion of the aileron, and 3 and 4 are two independently movable trailing edge portions. 5 is a shaft slidably and non-rotatably mounted in a bearing member 6 attached to the rear edge of the fixed portion 1 of the wing, one end of said shaft being connected by control rods 7 or the like to a lever in the pilot's cockpit. The shaft is provided with a rearwardly projecting arm 8 furnished with a ball end 9, the arrangement being such that sliding movement of the said ball end is along the axis 10 of the aileron hinge. The first movable trailing edge portion 3 of the aileron is attached to said aileron 2 by means of a hinge shown more clearly in Fig. 2a. The hinge comprises a rack 11 mounted in a casing 12 secured to the trailing edge of the aileron, said rack co-acting with a pinion 13 adapted to rotate a worm 40 on which a nut 41 is translatably mounted. The nut 41 is operatively connected with arms 14 secured to the leading edge of the movable portion 3. The arrangement is such that when the worm 40 is rotated the nut 41 is translated along said worm and rocks the arms 14. One end of the rack is furnished with a ball end 15 which is connected by bell-crank-levers 16, 17 and connecting rods 18, 19, 20 with the ball end 9 of the arm 8 on the sliding shaft 5 mounted on the fixed portion 1. The second movable trailing edge portion 4 is similarly controlled from the rack 11 by similar mechanism comprising the rack 11 parts 8a (fixed to the rack 11), 9a, 11a, 12a, 13a, 14a, 15a, 16a, 17a, 18a, 19a and 20a corresponding respectively to the aforesaid parts 5, 6, 7, 8, 9, 11, 12, 13, 14, 15, 16, 17, 18, 19, and 20. The said portion 3 rocks about the axis 10a along which the ball end 9a is arranged to slide.

When the aileron is operated to control the craft by the usual mechanism, the mechanism of the present invention is unaffected, i. e., it maintains the movable trailing edge portions in the same position relatively to the aileron, owing, as will be readily understood, to the fact that the ball ends 9, 9a on the arms 8, 8a of the sliding shafts 5, 5a are always located upon the axes of the hinges. The positions of the trailing edge portions may be independently altered relatively to the aileron, whilst the latter is stationary or in motion, by operating the control connected to the sliding shaft 5 which in turn moves the aforesaid racks, pinions and worms to turn said portions about their hinges. If desired, provision may be made whereby when the aileron 2 has been moved through a predetermined angle the trailing edge portions 3 and 4 may have movement imparted to them automatically. As it may be desired to prevent any movement of the controls between the portions 3 and 4 and the lever in the cockpit due to differences of pressure on said portions, an irreversible hinge may be employed to connect these portions with the aileron.

Referring to Figures 3 to 6, 21 is a fixed spar of the wing, 22, 23 are the front and rear movable elements of the wing and 24 is the auxiliary moving surface. The surface 24 is operated by mechanism similar to that above described comprising parts 5, 8, 20, 16, 19, 17, 18, 15, 11, 12 and 14 corresponding to the similarly marked parts of Figures 1 and 2, the part 5 being operated by a bell-crank-lever 25 connected by a rod 26 to a lever in the cockpit. The movable wing elements 22 and 23 are operated by a single bell-crank-lever 27, one arm of which is connected to a similar rod 28 and the other arm is connected to two shafts which are marked 11 to correspond with the similar shaft of Figures 1 and 2 and which operate corresponding arms 14, 14 attached to the said wing portions, the mechanism for operating these arms being contained in casings 12. As the shafts 11 are connected to the second arm of the bell-crank-lever 27 at different distances from the axis of the latter, the wing portions 22, 23 will receive different angular movements.

Referring to Figures 7 and 8, 29 is the fuselage, 30, 30 are the fixed portions of the wing and 31, 31 are the foldable portions. The said foldable portions are connected to the fixed portions by mechanisms similar to those hereinbefore described, the essential parts of such mechanisms being indicated by the corresponding reference numerals 11, 12 and 14. The parts 11 are connected to bell-crank-levers 32, 32 operated by rods 33, 33 from levers in the cockpit.

What I claim is:

1. Means for varying the contour of an aerofoil made in three or more parts connected together in tandem comprising hinge mechanisms operatively connecting together said parts in tandem, means for operating said hinge mechanisms said means being common to a plurality of said hinge mechanisms, and comprising axially slidable members adapted to move along the respective hinge axes.

2. Means for operably connecting together in tandem a plurality of parts of an aerofoil comprising a plurality of hinge mechanisms disposed in tandem and operatively connected respectively to the parts of the said body, an axially slidable member adapted to move along a hinge axis for operating one of said hinge mechanisms, and means for transmitting the operation to each succeeding hinge.

3. Means for operably connecting together in tandem a plurality of parts of an aerofoil comprising a plurality of hinge mechanisms disposed in tandem and operatively connected respectively to the parts of the said body, an axially slidable member adapted to move along a hinge axis for operating one of said hinge mechanisms, and means for transmitting the operation to each succeeding hinge, said transmitting means being disposed respectively within the respective interconnected parts of the said body or surface.

4. Means according to claim 3 wherein each hinge mechanism comprises a longitudinally displaceable member operatively connected to the transmission to the next hinge.

5. Means according to claim 3 wherein each hinge mechanism comprises a longitudinally displaceable member operatively connected to, so as to operate directly one of said axially slidable member adapted to move along a hinge axis.

6. Means according to claim 3 wherein the transmitting means between each pair of hinge mechanisms comprises a longitudinally displaceable member associated with each hinge mechanisms of each pair, an axially slidable member adapted to be moved by the first of said longitudinally displaceable members along the axis of the first hinge of said pair of hinge mechanisms, an intermediate member in line with and adapted to operate the longitudinally displaceable member associated with the second hinge of said pair of hinge mechanisms, and a mechanical transmission comprising bell-crank mechanism for transmitting the axial movement of said axially slidable member to the said intermediate member.

7. Means according to claim 3 wherein the means for operating the first of said axially slidable members comprises a member adapted to slide along a line parallel with the said hinge axes, means for operating said member from the cockpit of the machine, and means for transmitting the movement to the first axially slidable member adapted to move along a hinge axis.

8. Means according to claim 3 further comprising means for operating the first of said axially slidable members, said means comprising a member adapted to slide along a line parallel with the said hinge axes, means for operating said member from the cockpit of the machine, and means for transmitting the movement to the first axially slidable member adapted to move along a hinge axis, and transmitting means between each pair of hinge mechanisms comprising a longitudinally displaceable member associated with each hinge mechanism of each pair, an axially slidable member adapted to be moved by the first of said longitudinally displaceable members along the axis of the first hinge of said pair of hinge mechanisms, an intermediate member in line with and adapted to operate the longitudinally displaceable member associated with the second hinge of said pair of hinge mechanisms, and a mechanical transmission comprising bell-crank mechanism for transmitting the axial movement of said axially slidable member to the said intermediate member.

RENÉ TAMPIER.